April 10, 1956     C. R. REID     2,741,738
ELECTRICAL COIL TESTING APPARATUS
Filed Sept. 12, 1951     2 Sheets-Sheet 1

INVENTOR.
Carl R. Reid
BY
ATTORNEY.

April 10, 1956     C. R. REID     2,741,738
ELECTRICAL COIL TESTING APPARATUS
Filed Sept. 12, 1951     2 Sheets-Sheet 2

INVENTOR.
Carl R. Reid
BY
Harry S. [illegible]
ATTORNEY.

United States Patent Office 2,741,738
Patented Apr. 10, 1956

2,741,738

ELECTRICAL COIL TESTING APPARATUS

Carl R. Reid, Akron, Ohio, assignor to The Hoover Company, North Canton, Ohio, a corporation of Ohio Application September 12, 1951, Serial No. 246,204

19 Claims. (Cl. 324—52)

My invention relates to a testing apparatus particularly designed to perform production testing operations on electrical coil structures of widely varying types.

It is a particular object of my invention automatically to test a coil for short circuits, actual or potential, represented by metal-to-metal contact or by weak insulation, respectively, under conditions which subject the insulation of the coil under test to a high voltage stress without subjecting the same to high current or high heating effects.

It is a principal object of my invention to provide an apparatus in which a coil to be tested is subjected to a short duration, high voltage pulse, either directly or through an inductive coupling, generated by a condenser discharging through a thyratron switch which fixes an inverse charge or voltage on the condenser of a nature which is determined by the condition of the coil under test. During the time interval the inverse voltage appears across the condenser, the voltage thereof is measured by a testing apparatus and is utilized to activate a suitable signalling apparatus which will indicate whether the coil undergoing test is satisfactory or unsatisfactory.

It is another object of my invention to provide a device for testing motor armatures for short circuits in which an apparatus is provided for repeatedly charging a condenser and then discharging the same through a field winding inductively coupled with the armature under test while the armature is rotated to subject each armature conductor to the maximum stress at some time during the test.

It is another object of my invention to test a coil or winding for short circuits by producing extremely short duration, high voltage pulses in the coil or winding to be tested and then detecting and indicating short circuit induced variations from normal in the magnetic field of the coil or winding to be tested immediately following each test voltage pulse.

It is another object of my invention to provide a generator for producing periodic test voltage pulses having a short time period compared to the intervals between successive pulses and to subject a coil or winding to be tested to such voltage pulses directly or through a magnetic linkage and to discover short circuits by detecting magnetic deviations from normal produced by short circuits in the coil or winding to be tested.

Other objects and advantages of the invention will become apparent as the description proceeds when taken in connection with the accompanying drawings, in which.

Figure 1:
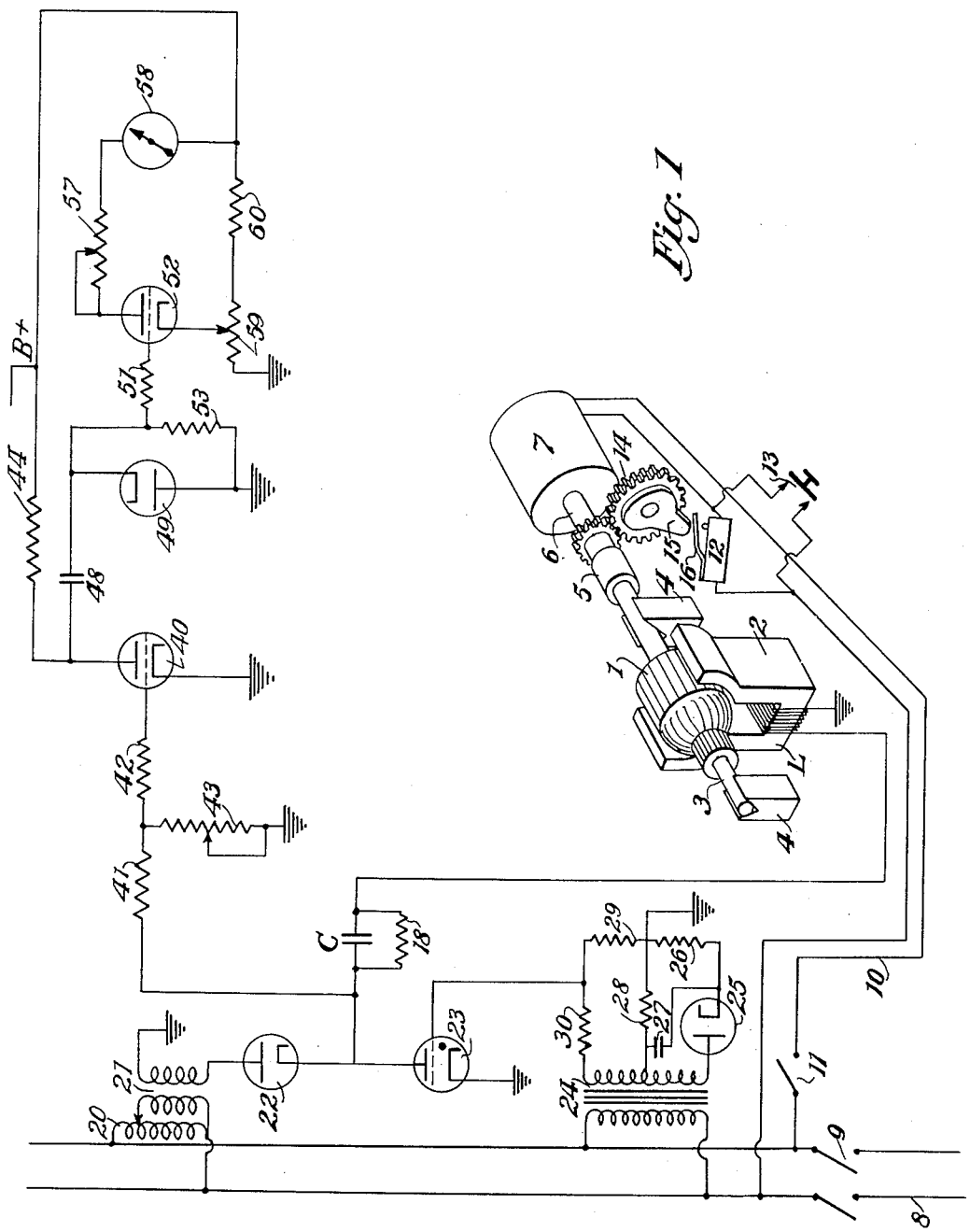
Figure 1 is a schematic wiring diagram of an apparatus embodying my invention applied to an arrangement for testing motor armatures.

Referring now to the drawing in detail, and first to Figure 1 thereof, the apparatus is illustrated as set up for testing a motor armature. The completed motor armature 1 to be tested is inserted endwise between the poles of a magnetic core, here illustrated as a standard motor field structure 2 with the shaft 3 of the motor supported in V-blocks 4 and having one end thereof engaged in a driving chuck 5 carried on the end of a shaft 6 of a drive motor and speed reducing device 7. The drive motor and speed reducing device 7 is energized from a 60-cycle supply line 8 controlled by a main energizing switch 9. The conductors 10 feeding the motor 7 are controlled by a main energizing switch 11 and one line of this circuit is interrupted by a normally closed circuit switch 12 which is shunted by a manually operated normally open circuit starting switch 13. In testing the apparatus, it is generally desirable to rotate the motor armature through several complete revolutions to be certain that every conductor therein is subjected to several testing operations to be described hereinafter. For this purpose, the motor shaft is arranged to drive a reduction gearing 14 which carries a cam 15 arranged to engage an operating lever 16 on the switch 12 to move the same to open circuit position after a predetermined number of complete revolutions of the shaft 6; for example, three. The apparatus is thus stopped with the switch 12 deenergizing the drive mechanism 7. To start the apparatus, the operator depresses the switch 13 to shunt the switch 12 until the cam 15 disengages from the lever 16 after which the switch 13 may be released.

The field structure 2 is provided with a standardized winding L having one end thereof grounded and the other end connected to a main charging and pulsing condenser C which is shunted by a high resistance element 18.

A variable transformer 20 is connected to the supply line 8 and to the primary of a charging transformer 21. The secondary of the transformer 21 has one end thereof grounded and the other end connected to the plate of the diode 22. The cathode of the diode 22 is connected to the condenser C and the anode of a switch thyratron 23.

The firing of the thyratron 23 is controlled by a mechanism now to be described. A transformer 24 has its primary connected to be energized by the supply line 8. One end of the secondary of the transformer 24 is connected to the plate of a diode 25 which has its cathode connected to a resistor 26 and a filtering condenser 27. The center of the secondary winding of the transformer 24 is connected to the other side of the filtering condenser 27 and to a resistor 28 which is connected to the grounded junction point of the resistor 26 and a resistor 29. The other end of the secondary of the transformer 24 is connected to a resistor 30 which is connected to the resistor 29. The control grid of the thyratron 23 is connected to the junction of the resistors 29 and 30.

The voltage divider network constituted by the resistors 26, 28, 29 and 30 and the filter condenser 27 applies a negative D. C. bias to the A. C. voltage applied to the thyratron grid, producing an output voltage wave form as indicated by the sine wave 32 in Figure 2 having its axis of symmetry negatively displaced from ground. The output voltage wave form of the secondary of the transformer 21 is indicated by the sine wave 33 in Figure 2 having an axis of symmetry at ground potential. The displacement of the voltage applied to the grid of the thyratron must be sufficient to keep the grid negative relative to the critical grid voltage for the applied thyratron plate voltage, condenser voltage, until after the plate of the diode 22 is driven negative and the diode 22 is nonconductive. The transformers 21 and 24 must be so connected that the outputs thereof are dephased by 180° so that the thyratron cannot be triggered into conduction while the diode is conducting; otherwise these two elements will constitute a short circuit on the secondary of the transformer 21. The values of the resistor network and condenser 27 associated with the diode 25 are chosen so that the grid of the thyratron reaches its critical voltage range approximately ⅛ of a cycle after the diode 22 has become non-conductive. The time interval between the peak value of the voltage wave 33, when the condenser C is charged to its maximum positive value, and the time when the diode 22 becomes non-conducting constitutes a waiting period with the condenser voltage condition indicated by wave form 34 on Figure 2; that is, the condenser retains its maximum positive charge while the diode 22 becomes non-conducting. When the thyratron grid voltage reaches the critical value and triggers the thyratron into conduction, the condenser C discharges with extreme rapidity through the thyratron and coil L; that is, the condenser, coil L, and thyratron 23 constitute a loop circuit. The loop circuit also includes the test armature through a magnetic linkage. The induction coil L and armature 1 in effect form a transformer subjected to an extremely rapid, high tension pulse voltage as the condenser discharges. The condenser discharge through coil L creates a magnetic field linking the test armature which induces a high pulse voltage in those armature conductors positioned to be cut by this field. The voltage pulse thus induced in the armature conductors will stress the armature insulation and test its effectiveness. If the armature is short circuited either by a metal-to-metal contact or an insulation puncture, the resulting current distorts the magnetic field produced by the coil L. After the condenser C discharges, the magnetic field induced by the discharge through coil L collapses tending to continue current flow in the same direction as the original discharge which places an inverse charge on the condenser C. If the test armature is normal, the inverse voltage on the condenser C will be as indicated by the negative excursion 35 of the wave form 34. If the test armature is short circuited, the negative excursion of the wave form 34 will be greater or less than the value 35 as indicated by the lines 36 and 37, respectively, of wave form 34. Generally, a simple short circuit in an armature will produce a condition indicated by the excursion 36, but a multiple short circuit may produce an excursion as indicated at 37. The inverse voltage applied to the condenser C is held thereon until the diode plate 22 becomes more positive than its cathode, connected to C, when a new charging period begins. The inverse voltage across the condenser C is retained because the thyratron 23 cannot conduct in a direction to remove the inverse charge. At the termination of the extremely short pulse period, current flow ceases and the thyratron deionizes to prepare for a succeeding pulse period. The grid bias on the thyratron 23 is far below the firing value by the time the diode 22 again becomes conducting. The inverse voltage on C indicates the condition of the test armature and is utilized to signal the armature condition to the operator.

The charging current for the condenser C which is applied through the diode 22 also flows through the coil L but the rate of change of this current is too slow to affect the armature 1 significantly.

It is assumed herein that the transformer 20 is supplied with 60-cycle alternating current. The voltage pulse produced by discharging condenser C is regulated by the transformer 20 to produce a high voltage pulse in the armature conductors. "High voltage" as used here means sufficient to stress the insulation of the armature conductors to a degree providing a factor of safety comporting with the design and rated operating voltage of the armature. The voltage pulses are of very short duration compared to the intervals between successive pulses; for example, if sixty pulses are produced per second, the voltage pulse period would be of the order of a few hundred microseconds. The period during which an inverse voltage appears across the condenser C is of comparatively long time duration as is apparent from the portions 35, 36 or 37 of the wave form 34.

The pulsing apparatus is supplied with 60-cycle current. There are sixty test cycles per second. The motor gear reduction apparatus 7 rotates the test armature at about sixty revolutions per minute. If the test armature is thus given three complete revolutions before the cam structure 15 de-energizes the armature drive mechanism, it will have been subjected to some one hundred-eighty test pulses, which will insure that each conductor in the armature will have been subjected to several pulses while the same is lying in the maximum inductive relation to the field structure 2. The foregoing values are exemplary only as other frequencies of test pulses and armature rotation rates may be used if desired.

The magnetic field of the winding under test is varied from normal if a short circuit is present which varies the field of coil L and hence varies the inverse voltage on the condenser C. The condenser C, coil L and magnetic core 2 thus constitute in part a means for detecting the variations produced by a short circuit in a test winding. The time duration of the field variation is extremely brief but the inverse condenser voltage is maintained for a comparatively long time period which facilitates the operation of a formal detecting and indicating system which measures and signals the magnitude of the inverse voltage.

The magnitude of the inverse voltage upon the condenser C is detected and caused to register upon a visual meter by a mechanism now to be described. The line connecting the condenser C with the cathode of the diode 22 is connected to the grid of a triode 40 through serially connected voltage dividing resistors 41 and 42. The junction of the resistors 41 and 42 is connected to ground through a variable resistor 43. The cathode of the amplifier triode 40 is grounded and the anode thereof is connected through a loading resistor 44 to a suitable source of steady positive plate voltage B+. The resistor network 41, 42 and 43 is subjected to the condenser charging voltage of the diode 22 and to the charging voltage of the condenser during the rest period represented by the substantially horizontal positive portion of wave form 34. The high resistance of this network does not permit significant discharge of the condenser C during the aforesaid rest period. The amplifier 40 operates without static bias and is saturated. The shape of the input voltage wave to the resistor 41 from the condenser C is indicated by the wave form 34 in Figure 3 which is substantially a replica of the wave form 34 of Figure 2 including the abnormal negative voltage excursions 36 and 37 indicating abnormal armature conditions. The effect of the resistors 41 and 42 is to draw current on the positive excursions of the voltage wave 34 to substantially eliminate the non-informative positive excursion of the wave form 34 from the grid bias; that is, the positive excursion of the wave form 34 is grid clipped. The voltage divider formed by the resistors 41 and 43 is utilized to regulate the signal strength applied to the grid of the triode 40; that is, the effective voltage input to the grid of the triode 40 is represented by the wave form 46 of Figure 3 which is substantially the negative portion of the wave form 34. When the grid of the triode swings negative, plate current is decreased and plate voltage increased, resulting in the output wave form 47 of Figure 3. The wave form 47 and the wave forms of Figure 3 to be described are derived from wave form 34 and have variable peak values reflecting armature conditions which are indicated by the reference characters 35, 36 and 37 to indicate their relation to the variable negative excursion of wave form 34. The plate of the triode 40 is connected through a condenser 48 to the cathode of a diode 49 having its plate grounded. The point of connection between the condenser 48 and cathode of the diode 49 is connected through a resistor 51 to the grid of a triode 52. A resistor 53 is connected between the cathode and grounded plate of the diode 49. The effect of the condenser 48, diode 49 and resistor 53 is to reference the wave form 47 to ground so that the input to the resistor 51 and grid of the triode 52 is represented by the wave form 55 of Figure 3. Any negative excursion of the wave form generated across the condenser 48 is shunted to ground by the diode 49. Positive excursions of the wave form 47 appear as wave form 55 across the resistor 53 and to apply a positive signal only to the grid of the triode 52.

The anode of the triode 52 is connected through a variable resistor 57 to a milliammeter 58. The cathode of the triode 52 is connected to a variable resistor 59, one end of which is grounded and the other end of which is connected to a resistor 60. The resistor 60 is connected to the milliammeter 58 and the plate voltage supply source. The voltage divider formed by the series connected resistors 59 and 60 biases the triode 52 well below the cut-off value. The extent of this bias is adjusted by the variable resistor 59 to conform with the signal input strength to the grid of the triode as determined by a particular testing set-up. The procedure used is to bias the triode 52 below the minimum voltage developed by any possible fault in a test armature. Under these circumstances, an armature undergoing test will vary the grid bias on the triode 52 producing varying plate currents.

Figure 3:
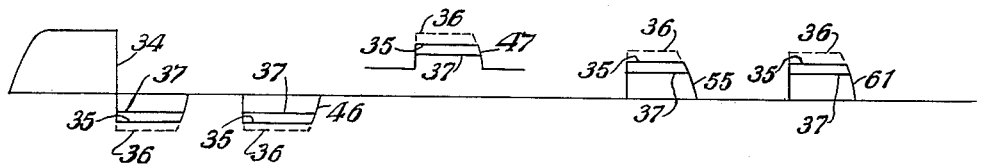
Figure 3 represents a series of stages of transformation of the information containing portion of a wave form generated during a testing operation.

The foregoing plate current conditions are indicated by the wave form 61 in Figure 3. Assume, for example, that the milliammeter 58 is graduated to produce full scale deflection by a plate current in the triode 52 of one milliampere. The tube 52 will then be biased, for example, so that a normal test coil will produce a deflection of approximately .5 milliampere, represented by the solid line 35 on the wave form 61. A short circuited member of the type producing an abnormally high inverse voltage on the main condenser C will produce substantially full scale deflection of the milliammeter 58 as represented by the dashed section 36 of the wave form 61. A short circuited member producing a less than normal inverse voltage across the test condenser C will produce a deflection of less than .5 milliampere in the milliammeter 58, as represented by the dashed line 37 of the wave form 61.

It is believed to be apparent from the foregoing that my apparatus provides a mechanism by which a normal or acceptable armature will produce a certain fixed deflection in the milliammeter 58. A short circuited condition may produce a greater or lesser deflection of the milliammeter 58.

As a practical matter, it has been found that each particular design of armature will have a certain, rather narrow range of the milliammeter for its normal or acceptable condition. A milliammeter deflection over or under this normal range indicates various types of short circuited conditions which justify rejection of the particular armature under test.

Furthermore, the armature under test is rotated through one or more complete revolutions during its test cycle and the shorted coil moves from a position cutting the flux field to one parallel to it; consequently, the milliammeter deflection will rise and fall, thus calling attention to the fault.

Figure 2:
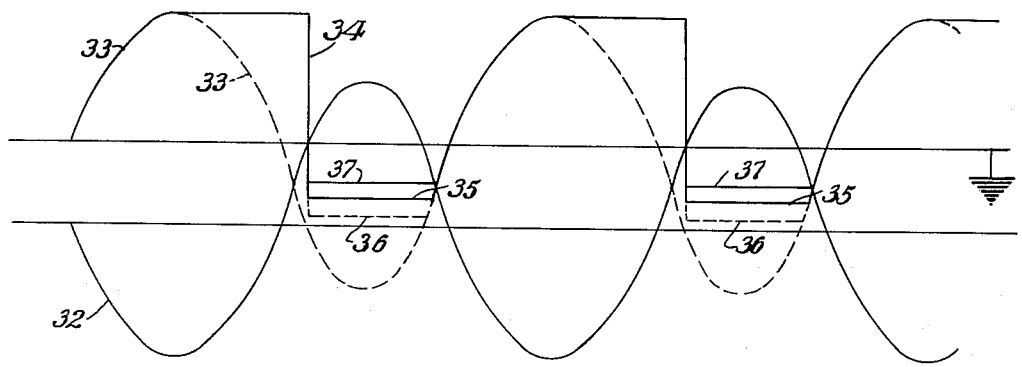
Figure 2 is a wave form diagram illustrating certain critical voltage conditions in my apparatus.
Figure 4:
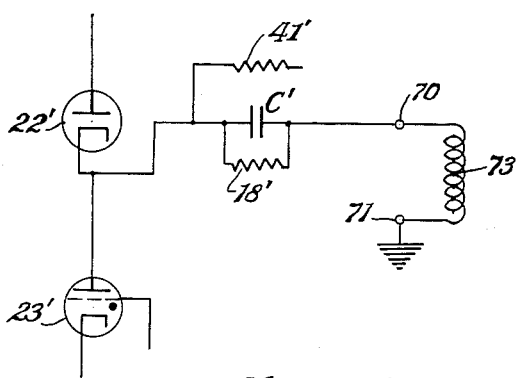
Figure 4 is a schematic wiring diagram of a modification of my invention.

I have described my invention as applied to a particular problem, namely an iron core armature having a large number of coils and a great many opportunities for various types of short circuited conditions. I have shown, in Fgiure 4, a modified form of the invention designed for testing a simple coil of any character. Since this form of the invention is identical in all particulars with that above described in connection with Figure 1, except with respect to the manner of handling the coil to be tested, only the pulsing condenser connection and coil connections have been illustrated. Parts of the apparatus of Figure 4 which are identical with parts of the apparatus of Figures 1 to 3 are given the same reference characters primed.

The coil 73 to be tested is connected to suitable quick detachable connectors 70 and 71 which are connected to the condenser C' and ground, respectively. The apparatus is then energized for a short time to obtain a readable deflection of the milliammeter. The pulses discharged from the condenser C' produce a magnetic field about the coil 73. The collapse of the magnetic field about the coil 73 places an inverse charge on the condenser C'. The inverse voltage on the condenser C' is applied to the resistor 41' and is fed to the detecting apparatus to energize the milliammeter which indicates a short circuit by an abnormal deflection as in the Figure 1 form of the invention. In this instance, a short circuit in the test coil produces a variation in a magnetic field directly produced by the test pulses and such variation introduces a variation in the inverse voltage applied to the condenser C' as before.

In each form of my invention, the coil or winding to be tested is subjected to short duration, high voltage pulses and variations in the magnetic field of the test coil or winding, resulting from a short circuit, are fixed in the form of a condenser voltage which is maintained for a significant time period and is then measured and indicated.

I claim:

1. Apparatus for testing a coil for short circuit comprising, a condenser, a source of alternating potential connected through a diode to charge said condenser periodically, an electronic switch connecting said diode and said condenser to ground, means for rendering said switch conductive after said diode is non-conducting and for rendering said switch non-conductive when said diode is conducting, means for applying a high pulse voltage to said coil from the discharge of said condenser and for charging said condenser inversely to said first charge thereon when the magnetic field produced by said pulse voltage decays, and means for indicating the magnitude of the inverse charge on said condenser.

2. Short circuit testing apparatus comprising, a condenser, means connected to one side of said condenser for impressing a coil to be tested with test voltage pulses produced by discharging said condenser, a thyratron switch having an anode connected to said condenser and a cathode connected to said means and a control grid, a diode having a cathode connected to the anode of said thyratron and an anode, a source of alternating current connected to the anode of said diode and the cathode of said thyratron, a source of grid voltage connected to said control grid including means for applying an alternating current voltage dephased with respect to the alternating current applied to said diode anode, and means for applying a negative direct current bias to said control grid voltage of sufficient magnitude to block conduction through said thyratron while said diode is conducting, and means for measuring variations in the voltage across said condenser induced by collapse of the field of the coil to be tested in the interval following discharge of said condenser through said thyratron and means for impressing test voltages on a coil to be tested and the application of a new charge to the condenser.

3. Armature short circuit testing apparatus comprising, a magnetic core, an energizing winding on said core, means for rotatably supporting an armature to be tested with the conductors of the armature in position to be linked by a magnetic field in said core, means for rotating an armature on said supporting means, means for energizing said rotating means, means for de-energizing said rotating means after a predetermined number of revolutions of an armature to be tested, a condenser connected to said winding, a thermionic switch connected to said condenser and said winding, means for charging said condenser periodically, means for rendering said thermionic switch non-conducting while said condenser is charging and for rendering said thermionic switch conducting in the intervals between condenser charges, and means for measuring and indicating the voltage appearing across said condenser in the interval between discharges thereof through said thermionic switch and the next succeeding charging operation of said charging means.

4. Short circuit testing apparatus comprising a condenser, a thyratron switch connected to said condenser, means for periodically applying a charge to said condenser, means connected to said condenser and to said switch for subjecting a coil to be tested to a high voltage pulse discharged by said condenser, means for firing said thyratron in the intervals between the application of charges to the condenser, and means for measuring variations in the inverse voltage appearing across said condenser induced by decay of the magnetic field of a test coil at the termination of a pulsing operation.

5. Apparatus according to claim 4 in which said means for subjecting a coil to a pulse voltage comprises a pair of terminals for connecting a coil to be tested to said condenser and said switch.

6. Apparatus according to claim 4 in which said means for subjecting a coil to a pulse voltage comprises a magnetic core having a portion shaped to fit a coil to be tested, and a winding on another portion of said core connected to said switch and to said condenser.

7. In a short circuit testing apparatus, a condenser, means connected to said condenser for impressing a coil to be tested with a test voltage pulse produced by discharging said condenser, a thermionic switch connected to said means and said condenser and operative to discharge said condenser when conducting, means for periodically charging said condenser, means for rendering said thermionic switch non-conducting when said charging means is charging said condenser and conducting in the intervals between charging of said condenser by said charging means, and means for measuring the inverse voltage across said condenser induced as a result of decay of the magnetic field of a coil under test following discharge of the condenser by said thermionic switch.

8. Apparatus according to claim 7 in which said means for impressing test voltage pulses on a test coil comprises a pair of terminals to which a coil to be tested is connected.

9. Apparatus according to claim 7 in which said means for impressing test voltage pulses on a coil to be tested comprises a magnetic core, a winding on said core connected to said condenser and said thermionic switch, and means for supporting a coil to be tested in position to have a test voltage induced therein by the field of said core produced by discharging said condenser through said winding.

10. Apparatus according to claim 7 in which said measuring means includes means connected to the junction of said condenser and said thermionic switch for suppressing the positive portion of the voltage wave across said condenser and for amplifying and inverting the negative portion of the waveform across said condenser, means for referencing said amplified and inverted waveform to a fixed reference voltage level, and means for visually indicating the level of said referenced voltage.

11. Apparatus according to claim 7 in which said measuring means includes a triode having a grid connected through a resistor to the junction of said condenser and said thermionic switch to suppress the positive excursion of the voltage wave across said condenser whereby said triode has an output waveform which is an inverted replica of the negative excursion of the voltage waveform across said condenser, means including a diode connected to the output of said triode for referencing the output waveform of said triode to ground, a triode having a grid connected to said means for referencing said waveform to ground and a cathode and an anode connected through a meter, and means for biasing the cathode of said last mentioned triode to produce a predetermined deflection of said meter when a normal coil is tested.

12. Apparatus according to claim 7 in which said measuring means comprises a network circuit connected to the junction between said condenser and said thermionic switch, and said network includes means for rejecting signal input thereto representing initial charging of said condenser before said thermionic switch is rendered conducting, means for referencing signal input representing inverse voltage across said condenser to a fixed voltage level, a meter, and means for applying a current to said meter proportioned to the excursion of said non-rejected signal input from said reference level.

13. Apparatus according to claim 7 in which said measuring means comprises, means connected to the junction of said condenser and said switch for suppressing signal voltage variations except said inverse voltage, an indicating meter, and means connected to receive the unsuppressed portion of said signal voltage and to apply current proportional thereto to said meter.

14. Apparatus according to claim 7 in which said measuring means is connected to respond to voltage variations across said condenser and includes means for suppressing voltage variations across said condenser produced by operation of said charging means, and means for visually indicating the level of said inverse voltage.

15. Armature short circuit testing apparatus comprising a magnetic core having pole portions spaced to embrace a test armature with the opposite sides of a single armature coil lying a maximum inductive relation to said pole portions, a winding on said core, means for rotatably supporting a test armature in position to be linked by a magnetic field of said core pole portions, a winding on said core, means for rotating a test armature on said supporting means to move the coils of a test armature successively into maximum inductive relation to said pole portions, and means for applying periodic test voltage pulses to said winding and for measuring the magnitude of the voltage induced in said winding by decay of the magnetic fields of said core and armature following a test voltage pulse.

16. Armature short circuit testing apparatus comprising a magnetic core having pole portions spaced to embrace a test armature with the opposite sides of a single armature coil lying a maximum inductive relation to said pole portions, a winding on said core, means for rotatably supporting a test armature in position to be linked by a magnetic field of said core pole portions, a winding on said core, means for rotating a test armature on said supporting means to move the coils of a test armature successively into maximum inductive relation to said pole portions, a condenser connected to said winding, means for periodically charging said condenser, means operative in the intervals between each condenser charging operation for discharging said condenser through said winding, and means for measuring the charge on said condenser following each discharge thereof prior to the next operation of said charging means.

17. Short circuit testing apparatus comprising, a condenser, means for impressing a test coil with test voltage pulses produced by discharging said condenser, a source of alternating potential, means for periodically charging said condenser from said source, a thermionic switch having an anode and a cathode connected to said condenser and said impressing means to form a loop circuit and a control grid, means for impressing said grid with an alternating potential having a substantially constant voltage bias sufficient to maintain said switch non-conducting except for a period beginning in time delayed relation to each operation of said condenser charging means and ending prior to the next succeeding operation of said condenser charging means to discharge said condenser through said impressing means, and means for measuring the charge on said condenser induced as a result of the decay of the magnetic field of a test coil subsequent to the discharge of the condenser and prior to the next succeeding operation of said condenser charging means.

18. Short circuit testing apparatus comprising, a loop circuit including a condenser, a thyratron switch and a coil, means for periodically applying a charge to said condenser, means for triggering said thyratron into conduction in time delayed relation to said charging operations to discharge the condenser through the coil and thyratron, and means for measuring and indicating the value of the inverse voltage on said condenser induced by the decay of the magnetic field of the coil following each discharge of the condenser.

19. Apparatus according to claim 18 including means providing a magnetic linkage between said coil and a conductor to be tested.

References Cited in the file of this patent

UNITED STATES PATENTS

| | | |
|---|---|---|
| 1,482,462 | Dubsky | Feb. 5, 1924 |
| 1,743,318 | Carrington | Jan. 14, 1930 |
| 1,792,320 | Peters et al. | Feb. 10, 1931 |
| 2,321,424 | Rohats | June 8, 1943 |
| 2,322,853 | Krebs | June 29, 1943 |
| 2,432,948 | Thompson | Dec. 16, 1947 |
| 2,525,413 | Johnson | Oct. 10, 1950 |
| 2,569,990 | Harter | Oct. 2, 1951 |